April 7, 1931.  E. NUEBLING  1,799,635

LIQUID FLOW METER

Filed April 9, 1928  2 Sheets-Sheet 1

INVENTOR
EDWARD NUEBLING
BY
ATTORNEYS

April 7, 1931. E. NUEBLING 1,799,635
LIQUID FLOW METER
Filed April 9, 1928 2 Sheets-Sheet 2
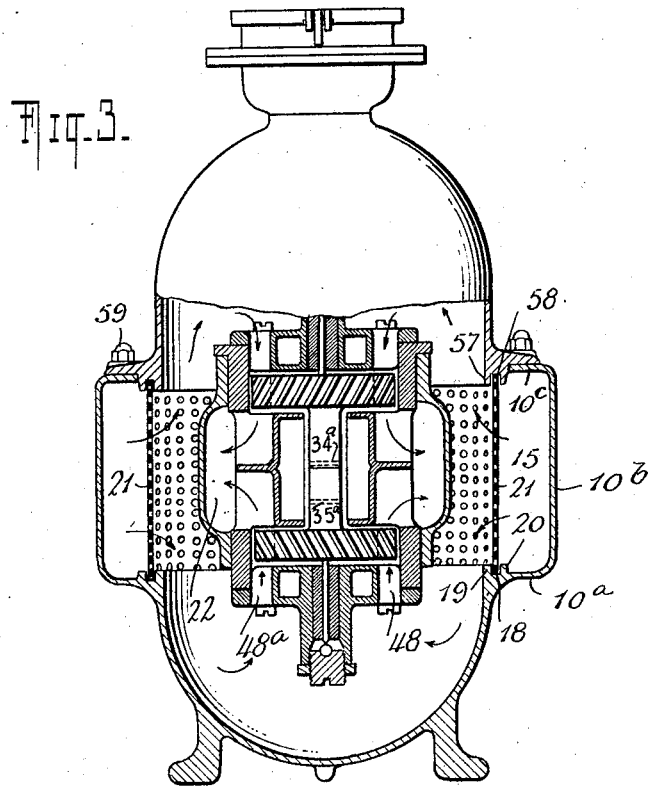
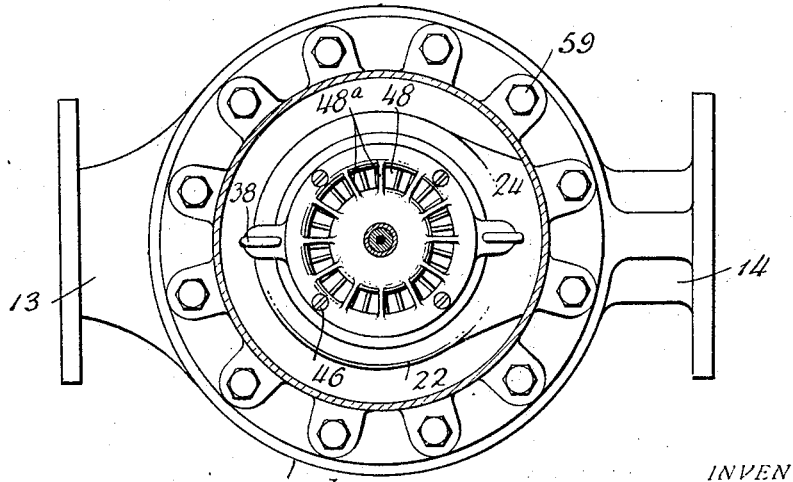
INVENTOR
EDWARD NUEBLING
BY
ATTORNEYS Patented Apr. 7, 1931

1,799,635

UNITED STATES PATENT OFFICE

EDWARD NUEBLING, OF NEW YORK, N. Y.

LIQUID-FLOW METER

Application filed April 9, 1928. Serial No. 268,452.

This invention relates to meters of the turbine, current or velocity type intended for measuring the flow of water through pipes and has for its principal object to provide a new and improved construction for such meters that will be very sensitive to changes in the velocity of flow and that will give an accurate measurement of the quantity of water passed through the meter under all conditions of service.

A further object is to incorporate in the construction of the meter, means for preventing entry of dirt or foreign matter into the operating parts of the meter, and to so construct and arrange such means that a thorough cleaning thereof may be performed without opening or disassembling the meter.

A further object is to so construct and arrange the parts as to prevent the formation of circulatory currents or eddy currents both at the inlet and outlet sides of the measuring wheels, and another object is to produce a meter of compact sturdy construction having a relatively large capacity for its size and in which a steady flow of the fluid is maintained without disturbance and without appreciable loss of head.

Figure 1:
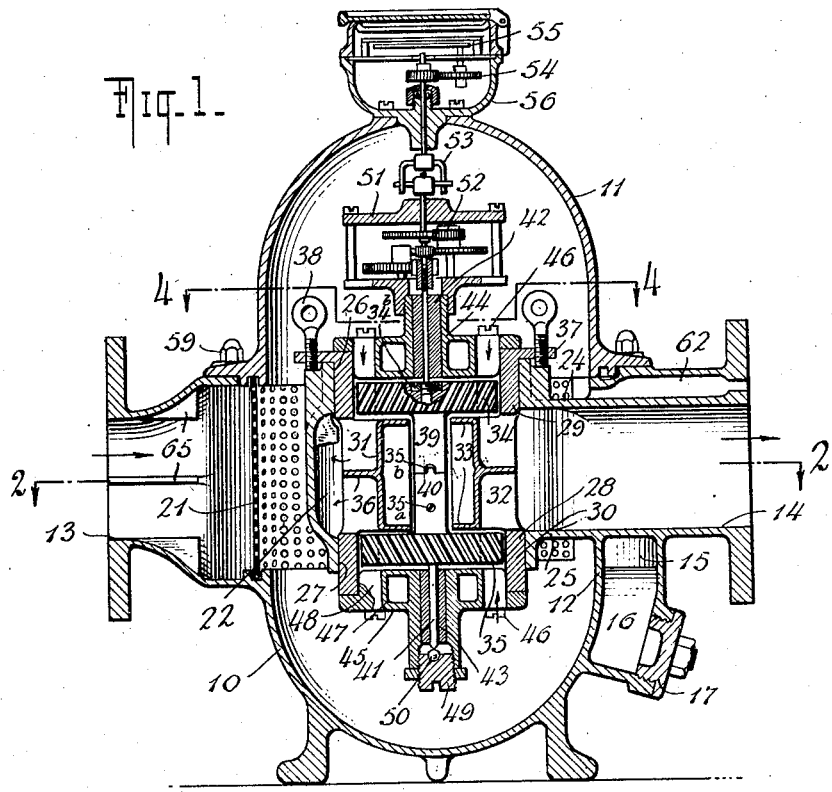
Figure 2:
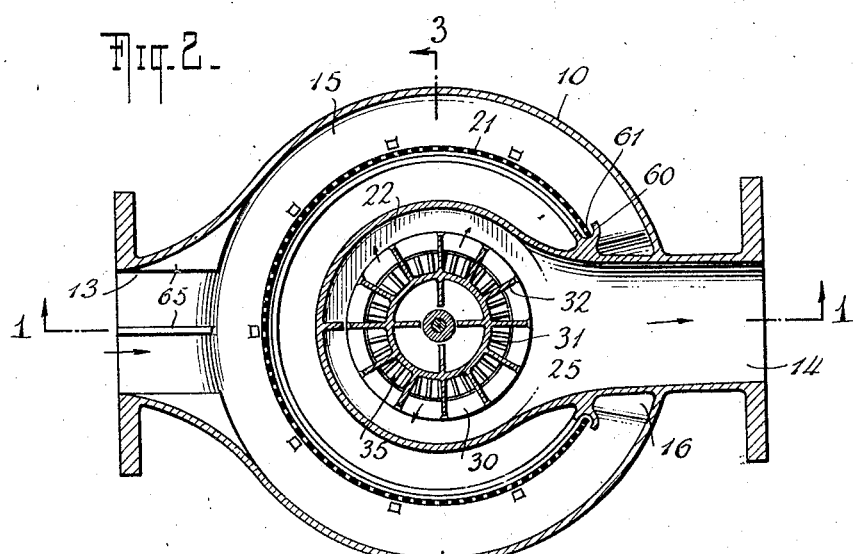

These and other objects will appear more fully from the following more detailed description and by reference to the accompanying drawings forming a part hereof and wherein Fig. 1 is a central vertical section through a meter constructed in accordance with the principles of my invention, this section being taken substantially from the line 1—1 of Fig. 2; Fig. 2 is a section upon the line 2—2 of Fig. 1; Fig. 3 is a section on the line 3—3 of Fig. 2 and Fig. 4 is a section on the line 4—4 of Fig. 1.

As shown in the drawings the meter preferably consists of a pair of outer casing members 10 and 11, the main portion of the walls of which members form a water chamber or compartment 12 in which the moving parts of the meter are mounted and into which chamber the water, whose velocity of flow is to be measured, is permitted to pass. The lower member 10 is of irregular construction and has formed integrally therewith a flanged inlet 13 and a flanged outlet 14 which are preferably of substantially cylindrical shape and communicate with the inner chamber 12. The outer wall of the lower casing member is provided with an outwardly flanged horizontally extending portion $10^a$, a vertically extending portion $10^b$ and an inwardly turned horizontally extending portion $10^c$ (see Fig. 3) which define an annular pocket or distributing chamber 15 extending about the meter substantially in alignment with the flanged inlet 13 and outlet 14. The annular chamber 15 at the outlet side of the meter communicates with a sump 16 having a draw off hole at the lower end thereof, said hole being closed by means of a screw cap 17.

At the point where the horizontally extending flange $10^a$, which forms the lower wall of the annular chamber 15, merges with the main body portion 10 of the lower casing member, a seat 18 is provided, said seat being defined between a small upwardly extending annular flange 19 formed at the inner periphery of the casing wall, and a plurality of upwardly projecting lugs 20 arranged at spaced intervals about the flange $10^a$. This seat serves to support a foraminated screen 21, which screen co-operates with the flanges $10^a$, $10^b$ and $10^c$ to define the annular chamber 15. It will be noted by referring to Fig. 2 of the drawings that the annular chamber 15 communicates with the flanged inlet 13 but that said chamber is out of communication with the outlet 14.

The outlet 14 communicates with a wheel chamber 22, the vertically extending side wall of which is concentric to the central axis of rotation of the measuring wheels. This wheel chamber 22 is defined by the vertical side wall just referred to, and by the upper and lower walls 24, 25 respectively, the latter having formed therein the flanged openings 26, 27 respectively. These openings are concentric with the axis of rotation and have mounted therein a central baffle member 28 having a pair of annular flanges 29, 30 the outer cylindrical walls of which fit neatly within the apertures 26, 27 respectively. Between the annular flanges 29, 30 the central baffle piece is provided with a central cylindrical portion 31 from which radiates a plurality of vertical vanes or baffles 32. The upper and lower ends of the cylindrical portion 31 are partially closed by horizontally extending walls 33 and said walls define with the inner cylindrical walls of the flanges 29, 30 a pair of pockets or recesses in which the turbine wheels 34, 35 are mounted. A horizontally extending web 36 projects laterally from the central portion 31 midway between the ends of the vanes or baffles 32, for a purpose presently to be described. The upper flange 29 of the member 28 has a pair of laterally projecting lugs 37 in which are received the lifting screws 38, by means of which the interior parts can be removed as a unit.

The turbine wheels 34, 35 are provided respectively with the stub shaft portions 39, 40 the ends of which contact at the horizontal center line of the device and the vanes of each wheel extend inwardly from the periphery of the wheel and terminate at their inner ends substantially in vertical alignment with the outer circumferential wall of the central portion 31 of the member 28 as indicated in Fig. 2.

The two wheels 34, 35 are fixed together to rotate in unison by means of a small central shaft 41 which passes through the stub shaft portions 39, 40 of said wheels and which projects upwardly and downwardly beyond the wheels 34, 35 respectively. A transverse pin 35$^a$ keys the wheel 35 to the shaft 41, while the wheel 34 is secured to said shaft by the interlocking of a pair of lugs and recesses 35$^b$, formed in the stub shafts 39, 40, a pin 34$^a$ passing through said lugs and a lock nut 34$^b$ being screwed against the upper face of the wheel 34. The outer projecting ends of the shaft 41 are mounted in bearings or journals 42, 43. These journals are mounted in central apertured bosses formed in upper, and lower, combined bearing and baffle members 44, 45 respectively, said members being provided with peripheral flanges which seat upon the ends of the flanges 29, 30 of the central member 28, the members 44, 45 being secured to the central piece 28 by means of screws 46. Each member 44, 45 is formed to provide a central baffle 47 preferably of cylindrical shape, the peripheral wall of which terminates in alignment with the inner ends of the vanes of the turbine wheels and in alignment with the outer circumferential wall of the central portion 31 of the member 28. The peripheral wall of the central baffle is also arranged to provide the inner wall of an annular conduit 48 through which the water is adapted to flow to the vanes of the turbine wheels. In the constructional example herein disclosed, the peripheral walls of the baffles 47 of the members 44, 45 co-operates with the inner walls of the flanges 29, 30 respectively, to form the annular conduits 48, but it will be obvious that the conduits could be formed solely in the members 44, 45. In either case the length of such conduits, considered from the entrance to the exit, should be not less than twice the width thereof so as to reduce jet contraction effects to a minimum. In order to prevent swirling of the water in the conduits 48 a plurality of radially extending vanes 48$^a$ are provided which extend radially across said channel. These vanes also serve to connect the horizontal annular flanges to the central part or baffle 47 of the meter.

The boss of the lower member 45 is internally threaded for the reception of a thrust bearing cap 49 having a recess in its inner face, in which is received a ball 50 upon which the lower end of the shaft 41 rests. The boss of the upper member 44 is externally threaded for the reception of a gearing cage 51, in which is mounted the reduction gears 52 which drive through the shaft connections 53, the gears 54 of the registering device 55, which may be of any suitable and well known construction and which is shown as mounted in a casing 56 secured to the upper casing member 11.

The upper casing member 11 is provided with a pair of annular flanges 57 which perform a function similar to that performed by the flange 19 and lugs 20 of the lower casing member, that is to say, said flanges 57 form an annular seat 58 for the upper edge of the screen 21. The upper casing member is bolted to the lower casing member by means of the bolts 59.

At the line of the juncture of the outlet 14 and chamber 22 the vertical side walls of said chamber are provided on the outer faces thereof with the vertically extending ribs 60 which preferably are provided with outwardly open grooves or recesses 61 in which the ends of the annular foraminated screen 21 are seated, said grooves co-operating with the seats formed by the annular flanges 19 and 57 and lugs 20 and 58 to prevent distortion of the screen 21 by the pressure of the water.

A by-pass 62 may, if desired, be formed in the lower casing member at the upper side of the outlet 14 to supply water to a by-pass meter of a compounding device.

The manner in which the device is assembled is as follows: The shaft 41 is inserted into the hollow shaft of turbine wheel 35 and made secure by means of pin 35$^a$. The turbine wheel 35 with shaft 41 is then placed with its stub shaft 40 in the central aperture of the member 28. Turbine wheel 34 is then inserted over shaft 41 in the central aperture of member 28 and secured to shaft 41 by means of pin 34$^a$ and lock nut 34$^b$. The bearing and vane members 44, 45 are then placed in position and secured to the central member 28 by the screws 46. The central member 28 is now placed within the lower casing with its flanges 29, 30 in engagement with the apertures 26, 27 formed in the walls 24, 25. The screen 21 is then placed with its lower edge seated within the recess formed between the flange 19 and lugs 20, and with its ends seated in the grooves 61 formed in the ribs 60. The spur pinion of the reduction gear is then secured to the top of shaft 41. The gear reduction cage 51 is then secured to the boss of the upper member 44 after which the upper casing member with the registering device secured thereto is placed in position upon the lower casing member, it being understood that the flange 57, and lugs 58 of the upper casing member are engaged over the upper edge of the screen 21. The bolts 59 are then inserted and screwed home to hold the parts in assembled condition.

In operation, the water enters the inlet 13 and flows about the distributing chamber 15 on the outer side of the screen 21. Any dirt or foreign matter carried along with the water will be prevented by the screen 21 from entering the meter. The water passing through the apertures of the screen 21 will flow both upwardly and downwardly into the main chamber 12 of the meter, from which the water flows through the conduits 48 provided in the upper and lower members 44, 45. This water impinges against the vanes of the turbine wheels 34, 35 and causes said wheels to rotate in unison. After passing through the turbine wheels the water is directed by the vanes 32 and web 36 into the chamber 22 from which it flows to the outlet 14. Rotation of the turbine wheels obviously causes the reduction gear 52 and registering device 55 to be actuated. The gearing serves to translate the revolutions of the wheels into convenient units of measure indicated by the register such as cubic feet or gallons. The register is therefore at all times a measure of the number of revolutions of the turbine wheels. It registers a true measure of flow only when the turbine wheels make the same number of revolutions for each unit of quantity passed through the meter under all conditions of flow. Any variation in the distribution of velocities through the meter due to obstructions at the inlet or to cross currents and eddies in the vicinity of the measuring wheels may cause the wheels to revolve faster or slower per unit of quantity and cause inaccurate registration. If the meter is not sensitive to changes in velocity of flow the meter will not respond to such changes and will not give an accurate registration of quantity.

In the meter herein disclosed the liquid, in passing from inlet to outlet, is caused to follow natural channels at all velocities of flow. On account of the large screen area as compared with the area of the inlet spud the velocity of approach to the conduits 48 is comparatively small and furthermore, since the liquid approaches the conduits from all sides at low velocity and in even distribution, variable jet like streams that impinge on the wheel vanes at different points and cause the wheels to run faster or slower per unit of quantity are effectively eliminated.

It will be noted that the provision of the screen 21 which extends entirely about the main water compartment 12 results in a construction in which the water enters said compartment from substantially all sides thereof and that swirling of the water or the formation of eddy currents in the main chamber 12, due to a partially closed valve or bend in the pipe near the inlet to the meter, is effectively prevented at the inlet end of the meter. The provision of the upper and lower fixed baffle members 44, 45 and the construction and arrangement of these members also insures that the water will be directed to the turbine vanes in a steady, even flow without the formation of any swirling or eddy effects adjacent to the turbine wheels and without the setting up of local disturbances such as occur when baffles which rotate with the wheels are provided at the inlet and outlet sides of the wheels. The water moving the turbine vanes also is prevented from swirling and causing friction loss by the provision of the outlet guide vanes or baffles 32 and central web or baffle 36. Both the inlet 13 and outlet 14 communicate with chambers each of which has a flaring mouth so that no obstruction is presented to the passage of the water to and from the meter in hereby a free flow is secured with a minimum of friction losses.

When it is necessary to remove any dirt or sediment from the screen chamber 15 it is only necessary to remove the cap 17 without disassembling the casing parts.

The baffles 47 of the members 44, 45 prevent the water flowing to the turbine wheels from coming into contact with the central circular area of the outwardly facing sides of the wheels, which area extends from the inner ends of the turbine vanes to the shaft 41. In constructions where the water is permitted to strike this area, the effect of centrifugal force due to the rotation of the turbine wheels sets up variable radial circulatory currents along the faces of the turbine wheels which currents obviously move from the axis of rotation towards the periphery of the wheel and tend to form eddies in the annular zone of the turbine buckets, which eddies run counter to the incoming stream of water and as a result of these local disturbances the meter will not register accurately and uniformly. In the construction herein disclosed the provision of the baffles 47 effectively prevents the formation of such local disturbances. It will be noted that upon the outlet sides of the buckets of the turbine wheels the central cylindrical portion 31 of the member 28 performs a somewhat similar function to the parts 47, in that the said central portion provides a baffle which extends from the inner end of the turbine vanes to the periphery of the stub shafts 39, 40, thereby preventing swirling of the liquid after it leaves the buckets and troublesome cross currents and eddies at the outlet side of the meter and loss of energy as a result thereof are eliminated.

It will be seen that the arrangement of the circular screen chamber 15 with the annular screen 21 and also the provision of the circular baffles 47 and 31 insures a steady, even flow of the water through the meter from the inlet to the outlet thereof. The circular screen chamber preventing as hereinbefore pointed out the formation of eddy currents at the inlet, the water flowing smoothly through the interstices of the screen upwardly and downwardly and flowing to the annular conduits 48 uniformly from all points about the periphery of the wheels. The water also flows from the turbine buckets steadily and uniformly, the provision of the plurality of radial vanes or baffles 32 combined with the central baffle 36 serving to confine the stream to natural channels and preventing unsteady motion or cross currents with consequent loss of available energy which increases the loss of head or pressure through the meter.

Baffles 65 are preferably provided on the inner wall of the inlet spud to break up spiral or swirling motion of the water due to a bend or to a partially closed valve near the spud. It will be seen that the general arrangement and construction of the parts results in the production of sturdy, rugged meter that will operate reliably with a minimum of attention and which will have a relatively large capacity for its size, and that the water will flow through the meter steadily without disturbance, and with a negligible loss of head.

While the invention has been described and claimed as a water meter it will be understood that the term "water" has been used merely as descriptive and not in a limiting sense, and that the invention is applicable for use in measuring the flow of any liquid whatsoever. It will likewise be understood that the specific structural details of the constructional example herein exemplified are merely illustrative and that many changes, variations and modifications may be resorted to without departing from the principles of my invention.

I claim:

1. In a water meter, a casing defining a main chamber and having an inlet, an outlet, and a protruding annular portion, a screen defining with said protruding portion of the casing an annular distributing chamber in communication with said inlet and through which all the water entering said inlet passes to said main chamber through said screen, said casing having means operatively associated therewith to provide a central compartment in communication with said outlet and having aligned openings at the top and bottom thereof to said main chamber, a pair of turbine wheels, a shaft on which both of said turbine wheels are mounted in axially spaced relationship to rotate in said aligned openings, a stationary cylindrical baffle mounted between said wheels and having its circumferential walls in alignment with the inner ends of the turbine buckets, and an annular baffle projecting laterally and outwardly from said circumferential wall substantially midway between said wheels.

2. In a water meter, a casing defining a main chamber and having an inlet, an outlet, and a protruding annular portion, a screen defining with said protruding portion of the casing an annular distributing chamber in communication with said inlet and through which all the water entering said inlet passes to said main chamber through said screen, said casing having means operatively associated therewith to provide a central compartment in communication with said outlet and having aligned openings at the top and bottom thereof to said main chamber, a pair of turbine wheels, a shaft on which both of said turbine wheels are mounted in axially spaced relationship to rotate in said aligned openings, a stationary cylindrical baffle mounted between said wheels and having its circumferential walls in alignment with the inner ends of the turbine buckets, an annular baffle projecting laterally and outwardly from said circumferential wall substantially midway between said wheels, and a plurality of radial baffles extending outwardly from said circumferential wall.

3. In a water meter, a casing defining a main chamber, means associated with said casing for defining an outlet and a compartment in communication therewith, said compartment having a pair of spaced axially aligned openings, a wheel cage having a pair of spaced bearing surfaces in engagement with the walls of said openings, and a central cylindrical portion located within said chamber, a pair of turbine wheels having peripheral buckets and located at the ends of said central portion with said buckets projecting radially beyond said portion, and a pair of baffle members secured to said cage and located between said wheels and said main chamber.

4. A water meter as set forth in claim 3 in which the pair of baffle members are also provided with central cylindrical portions in alignment with the central cylindrical portion of said cage, and each of said cylindrical portions is provided with a plurality of radially extending vanes.

5. In a water meter, a casing having a circular cross section and provided with an inlet, an outlet, and a protruding annular portion, an annular partition wall concentrically arranged in said casing and forming a water wheel chamber open to the interior of said casing at the top and bottom of said waterwheel chamber only, and means co-operating with said partition wall and the wall of said casing to cause water entering said inlet to be deflected equally about said casing to flow uniformly to the top and bottom of said chamber about the entire periphery thereof, said means comprising an annular foraminated partition arranged opposite to, and between, said inlet and said wall and forming with the annular portion of said casing an annular screen chamber through which all the water entering said inlet must pass before reaching said wheel chamber, and said annular chamber being closed at the top and bottom thereof to cause said water to flow through the foraminations of said partition in radial directions only and uniformly about the entire extent thereof.

6. In a water meter, a casing having an inlet, an outlet and a protruding central portion of substantially circular cross sectional configuration in a horizontal plane, an approximately cylindrical wall concentric with said central portion of said casing, located opposite said inlet and defining a water wheel chamber open to the interior of said casing at the top and bottom of said water wheel chamber only, and an approximately cylindrical foraminated partition arranged concentrically between said wall and casing, opposite to said inlet and forming with said protruding portion of said casing an annular chamber through which and said partition all the water entering said inlet must pass before it flows to said wheel chamber.

In testimony whereof, I have hereunto set my hand.

EDWARD NUEBLING.